United States Patent
Singer et al.

(10) Patent No.: US 6,761,115 B2
(45) Date of Patent: Jul. 13, 2004

(54) CLOCK GENERATOR FOR AN IMAGING DEVICE USING PRINTING FORM ANGULAR POSITION

(75) Inventors: Robert Singer, Malsch (DE); Andreas Wiedemann, Sandhausen (DE)

(73) Assignee: Heidelberger Drunkmaschinen AG, Heidelberg (DE)

( * ) Notice: Subject to any disclaimer, the term of this patent is extended or adjusted under 35 U.S.C. 154(b) by 0 days.

(21) Appl. No.: 10/139,974

(22) Filed: May 7, 2002

(65) Prior Publication Data

US 2002/0162471 A1 Nov. 7, 2002

Related U.S. Application Data

(60) Provisional application No. 60/307,153, filed on Jul. 23, 2001.

(30) Foreign Application Priority Data

May 7, 2001 (DE) .......................... 101 22 114

(51) Int. Cl.$^7$ ............................ F42B 10/00; B41J 5/30; B41J 21/17; B41J 11/44
(52) U.S. Cl. ........................... 101/484; 400/61; 400/70; 400/76
(58) Field of Search ....................... 400/61, 124, 322, 400/279, 320, 70, 76; 101/467, 136, 93.04, 401.1, 463, 484

(56) References Cited

U.S. PATENT DOCUMENTS

| | | | | |
|---|---|---|---|---|
| 4,225,931 A | * | 9/1980 | Schwefel | 702/150 |
| 4,264,957 A | * | 4/1981 | Pautzke | 700/125 |
| 4,317,113 A | * | 2/1982 | Honma | 340/630 |
| 4,318,176 A | * | 3/1982 | Stratton et al. | 700/125 |
| 4,346,447 A | * | 8/1982 | Takahama | 702/94 |
| 4,415,286 A | * | 11/1983 | Jennings | 400/279 |
| 4,507,002 A | * | 3/1985 | Matsumoto et al. | 400/322 |
| 4,596,183 A | * | 6/1986 | Steiner et al. | 101/216 |
| 4,877,343 A | * | 10/1989 | Hori | 400/124.04 |
| 5,163,368 A | | 11/1992 | Pensavecchia et al. | 101/136 |
| 5,174,205 A | | 12/1992 | Kline et al. | 101/136 |
| 5,394,147 A | * | 2/1995 | Miyake | 341/161 |
| 5,813,345 A | * | 9/1998 | Fuller et al. | 101/463.1 |
| 5,868,075 A | * | 2/1999 | Kline et al. | 101/467 |
| 5,934,195 A | * | 8/1999 | Rinke et al. | 101/401.1 |
| 6,024,504 A | * | 2/2000 | Weichmann et al. | 400/61 |
| 6,052,422 A | * | 4/2000 | Lin | 375/355 |
| 6,057,715 A | | 5/2000 | Kawasaki | 327/106 |
| 6,072,511 A | * | 6/2000 | Mueller et al. | 347/131 |
| 6,169,504 B1 | * | 1/2001 | Park | 341/141 |
| 6,343,549 B1 | * | 2/2002 | Tokiwa | 101/248 |
| 6,526,889 B2 | * | 3/2003 | Tokiwa | 101/485 |

FOREIGN PATENT DOCUMENTS

| | | | |
|---|---|---|---|
| DE | 27 29 697 A1 | 1/1979 | |
| DE | 42 26 236 C1 | 2/1994 | |
| DE | 197 43 943 A1 | 4/1999 | |
| EP | 0 484 576 B1 | 5/1992 | |
| GB | 2269468 A | * 5/1991 | ............. B41J/2/30 |
| JP | 04 127 017 A | 4/1992 | |

* cited by examiner

Primary Examiner—Andrew H. Hirshfeld
Assistant Examiner—Wasseem H. Hamdan
(74) Attorney, Agent, or Firm—Laurence A. Greenberg; Werner H. Stemer; Gregory L. Mayback

(57) ABSTRACT

A clock generator for generating a clock signal for an imaging device serving for transferring image-setting information to a rotatable printing form which includes an input to which an actual value signal dependent upon an angular position of the printing form is applicable, and an output for outputting the clock signal. It further includes a first comparator having a first input whereto the actual value signal is applicable as an analog signal, a second input to which an analog nominal value signal, respectively, representing a nominal value for the angular position of the printing form, is applicable, and an output for outputting the clock signal formed as a function of a result of a comparison between the analog actual value signal and the analog nominal value signal; an imaging device and a printing machine including the clock generator; and a method of generating a clock signal for an imaging operation.

13 Claims, 2 Drawing Sheets

CLOCK GENERATOR FOR AN IMAGING DEVICE USING PRINTING FORM ANGULAR POSITION

CROSS-REFERENCE TO RELATED APPLICATION

This application claims the benefit of U.S. provisional application No. 60/307,153, filed Jul. 23, 2001.

BACKGROUND OF THE INVENTION

FIELD OF THE INVENTION

The invention relates to a clock generator for an imaging device and a method of generating a clock signal for the imaging operation.

When setting an image on a printing form, which is generally clamped on a cylinder, the desired information is transferred to the printing form with the aid of an imaging or image-setting power source. With the imaging power source, the entire area of the printing form whereon an image is to be set is scanned successively or at least to some extent in parallel, if the imaging power source is formed of a number of individual power sources. In this regard, the information is transferred to the printing form in accordance with an original in the form of individual pixels or dots or groups thereof.

In order to achieve high-quality imaging on the printing form, on the one hand, the imaging power source must have adequate focussing properties or the imaging device must have appropriate elements with the aid of which ultimately adequate focussing can be achieved. On the other hand, it is necessary for the pixels or dots, respectively, to be written into the printing form exactly at the assigned position thereof. This places high requirements on the positioning of the imaging power source relative to the printing form, in particular, in the case of high-resolution imaging. The positioning can be carried out by mutually coordinated movements of the printing form and the imaging light source. In this regard, the printing form is generally subjected to a rotational movement and the imaging power source is subjected to a translational movement parallel to the longitudinal axis of the cylinder whereon the printing form is clamped.

An incremental encoder can be used for registering the rotational movement of the printing form. The resolution of conventional incremental encoders is generally lower, however, than the positioning accuracy required in the circumferential direction of the printing form. Therefore, various devices for increasing the resolution in imaging devices and in other devices, respectively, have already been proposed heretofore.

U.S. Pat. No. 5,174,205 discloses a control system for a discharge device for setting an image on a printing form which is clamped on a cylinder. Arranged on the cylinder is a rotary encoder which emits a signal dependent upon the rotational angle of the cylinder. The signal from the rotary encoder is fed to a phase locked loop-circuit, which generates therefrom a signal with a higher resolution, which is synchronized with the original angle signal. The discharge device is controlled based upon the signal generated in this manner, correction data, in particular, for correcting geometric errors of the printing form, being also taken into consideration.

The published German Patent Document DE 42 26 236 C1 describes a device for controlling electronically triggerable devices which are arranged on a rectilinearly reciprocatable carriage, slide or the like. The control device comprises an incremental encoder which outputs a clock signal as a function of the position of the carriage, slide or the like, and a fine-step timing generator which generates a multiplicity of fine-step clock cycles between successive increments of the incremental encoder. A triggering cycle for the electronically triggerable devices, respectively, is generated after a prescribed or predefined number of fine-step clock cycles. In order also to achieve highly accurate triggering of the electronic devices during nonuniform movement of the carriage, slide or the like, the fine-step timing generator is coordinated with the incremental encoder. For this purpose, a desired or nominal value for the number of fine-step clock cycles within the time period between two increments of the incremental encoder is prescribed or predefined. If the incremental encoder outputs a further clock signal before the nominal value has been reached, the fine-step timing generator then generates the fine-step clock cycles missing from the nominal value as quickly as possible, i.e., at the system clock rate. If, on the other hand, the nominal value has been reached before the incremental encoder outputs a further clock signal, the generation of further fine-step clock cycles is then stopped until the further clock signal has been outputted by the incremental encoder.

U.S. Pat. No. 6,057,715 describes a clock generator for generating a clock signal of any desired frequency from a reference clock signal. The clock generator has a counter which in each case counts up at the cycle rate of the reference clock signal and outputs appropriate numeric values. Through the intermediary of a sine-wave table, the clock generator converts successive numeric values into function values of a prescribed or predefined number of sine waves. From the function values, with the aid of a digital/ analog converter, an analog sinusoidal signal is generated, which is filtered and fed to a comparator. The comparator converts the sinusoidal signal, by comparison with a prescribed threshold, into a clock signal of square-wave form. The frequency of the thus generated clock signal, in relation to the frequency of the reference clock signal, is determined by the ratio between the number of sine waves which are stored in the sine-wave table as function values for one pass through the counter, and the size of the counter.

The conventional devices, respectively, have the disadvantage that fluctuations in the rotational speed are not or are only inadequately taken into consideration. These fluctuations in the rotational speed therefore lead to a reduction in the achievable accuracy when the clock signals generated by the conventional devices are used for imaging on printing forms.

Furthermore, the published German Patent Document DE 27 29 697 A1 describes a method for interpolating signals from a sine-cosine rotary encoder. The method is based upon the fact that the sine and cosine signals from the rotary encoder, after being digitized by an A/D (analog/digital) transducer or converter, are subjected to the arctan formation in order to calculate the phase angle. The published European Patent Document EP 0 484 576 B1 discloses a device for subdividing analog periodic signals. The interpolation described in this document is based upon a method wherein a comparison phase vector is generated which is varied until it coincides with the actual phase vector from the rotary encoder with a desired accuracy.

A common drawback of these heretofore known methods is that, initially, angle information is produced, which can be used only via at least one further processing step for generating a clock signal. In principle, the angle information is made available only at discrete times, because of the sampling rate of the A/D converter. In order to use this angle information to generate a clock signal of a required frequency, in the case of the heretofore known methods it is necessary to obtain the angle information at a higher frequency than the clock signal. The formation of non-even-numbered interpolation factors is possible only to a restricted extent or with great outlay or expense.

SUMMARY OF THE INVENTION

It is therefore an object of the invention, to provide a clock generator for an imaging device, which, even under unfavorable operating conditions, ensures that high accuracy is achieved when setting an image on a printing form.

With the foregoing and other objects in view, there is provided, in accordance with one aspect of the invention, a clock generator for generating a clock signal for an imaging device serving for transferring image-setting information to a rotatable printing form, the clock generator comprising an input to which an actual value signal dependent upon an angular position of the printing form is applicable, and an output serving for outputting the clock signal, and further comprising a first comparator having a first input whereto the actual value signal is applicable as an analog signal, a second input to which an analog nominal value signal, respectively, representing a nominal value for the angular position of the printing form, is applicable, and an output serving for outputting the clock signal formed as a function of a result of a comparison between the analog actual value signal and the analog nominal value signal.

In accordance with another feature of the invention, the clock first comparator serves for outputting a clock pulse, respectively, when there is agreement between the amplitude of the analog actual value signal and the amplitude of the analog nominal value signal.

In accordance with a further feature of the invention, the clock generator further comprises a memory wherein the nominal values for the angular position of the printing form are stored.

In accordance with an added feature of the invention, the clock generator further comprises an arithmetic unit for determining the nominal values for the angular position of the printing form.

In accordance with an additional feature of the invention, the clock generator further comprises a correction value memory wherein correction values for correcting the nominal values for the angular position of the printing form are stored.

In accordance with yet another feature of the invention, the clock generator further comprises a digital/analog converter into which the nominal values for generating the analog nominal value signal are feedable.

In accordance with yet a further feature of the invention, the actual value signal has a sinusoidal waveform.

In accordance with yet an added feature of the invention, the clock generator further comprises a second comparator having an input to which the analog actual value signal for the angular position of the printing form is applicable, and the second comparator having an output serving for outputting a starting signal for starting the clock generator when the analog actual value signal satisfies a prescribed condition.

In accordance with another aspect of the invention, there is provided an imaging device for a printing machine, comprising a clock generator for generating a clock signal for the imaging device which serves for transferring image-setting information to a rotatable printing form, the clock generator comprising an input to which an actual value signal dependent upon an angular position of the printing form is applicable, and an output serving for outputting the clock signal, and further comprising a first comparator having a first input whereto the actual value signal is applicable as an analog signal, a second input to which an analog nominal value signal, respectively, representing a nominal value for the angular position of the printing form, is applicable, and an output serving for outputting the clock signal formed as a function of a result of a comparison between the analog actual value signal and the analog nominal value signal.

In accordance with a further aspect of the invention, there is provided a printing machine, comprising a clock generator for generating a clock signal for an imaging device serving for transferring image-setting information to a rotatable printing form, the clock generator comprising an input to which an actual value signal dependent upon an angular position of the printing form is applicable, and an output serving for outputting the clock signal, and further comprising a first comparator having a first input whereto the actual value signal is applicable as an analog signal, a second input to which an analog nominal value signal, respectively, representing a nominal value for the angular position of the printing form, is applicable, and an output serving for outputting the clock signal formed as a function of a result of a comparison between the analog actual value signal and the analog nominal value signal.

In accordance with an additional aspect of the invention, there is provided a method for setting an image on a rotatable printing form, which comprises transferring image-setting information to the printing form as a function of a clock signal depending upon an angular position of the printing form, after determining the clock signal from an analog actual value signal dependent upon the angular position of the printing form and an analog nominal value signal specifying the respective nominal value for the angular position of the printing form, via an analog comparison.

In accordance with another mode, the method of the invention further comprises determining the nominal values for the angular position of the printing form in advance in a calibration run, and storing the determined nominal values.

In accordance with a further mode, the method of the invention further comprises determining correction values for correcting the nominal values for the angular position of the printing form in advance in a calibration run, and storing the determined correction values.

In accordance with a concomitant mode, the method of the invention further comprises processing at least two actual value signals having a phase offset relative to one another.

In order to achieve great accuracy when setting an image on a rotatable printing form, the clock generator according to the invention outputs at the output thereof a highly accurate clock signal for the imaging device, the signal being synchronized exactly with the rotational movement of the printing form. Applied to the input of the clock generator is an actual value signal which depends upon the angular position of the printing form. As an essential component, the clock generator has a first comparator with a first input, to which the actual value signal is applied as an analog signal. A second input of the first comparator has an analog nominal value signal applied thereto which, respectively, represents a nominal value for the angular position of the printing form.

At the output of the comparator, the clock signal formed as a function of the result of a comparison between the analog actual value signal and the analog nominal signal is outputted. This clock signal or a signal derived therefrom is ultimately used for controlling the imaging device, i.e., for determining the timing during the transmission of the imaging or image-setting information to the printing form.

The clock generator according to the invention offers the advantage that the clock signal output is synchronized exactly with the rotational movement of the printing form at every time, to be specific, even when this rotational movement is not uniform.

In a preferred embodiment of the clock generator according to the invention, the first comparator, respectively, when there is agreement between the amplitude of the analog actual alue signal and the amplitude of the analog nominal value signal, outputs a clock pulse, i.e., the clock pulse is outputted exactly when the printing form reaches the angular position prescribed by the analog nominal value signal.

The nominal values for the angular position of the printing form can be stored in a memory of the clock generator. As an alternative thereto, the clock generator can also have an arithmetic unit for determining the nominal values for the angular position of the printing form.

The clock generator according to the invention additionally offers the advantage that a correction value memory may be provided, wherein correction values for correcting the nominal values for the angular position of the printing form are stored. This makes it possible to take into account any deviations of the geometry of the printing form from a prescribed or predefined ideal shape, or other errors in the nominal values, and therefore to compensate therefor as early as during the generation of the clock signal, so that subsequent error correction, for example, during the control of the imaging device, is not required.

In addition, the clock generator according to the invention offers the advantage that it is able to process actual value signals with a sinusoidal waveform, as are generated by commercially available angular position transmitters (rotary encoders).

A starting signal for starting the clock generator according to the invention can be generated by a second comparator. The second comparator outputs the starting signal when the analog actual value signal applied to the input thereof satisfies a prescribed condition.

In the method according to the invention for setting an image on a rotatable printing form, imaging or image-setting information is transferred to the printing form as a function of the clock signal, which depends upon the angular position of the printing form. The clock signal is determined from the analog actual value signal, which depends upon the angular position of the printing form, and the analog nominal value signal, which specifies the respective nominal value for the angular position of the printing form, via an analog comparison.

The nominal values for the angular position of the printing form can be determined in advance in a calibration run, and stored. This offers the advantage that the nominal values are matched to the actual conditions, and error correction when carrying out the setting of an image is rendered superfluous.

As an alternative thereto, it is also possible to determine and to store correction values for correcting the nominal values for the angular position of the printing form during the calibration run carried out in advance. These correction values can be used both in an embodiment of the clock generator wherein the nominal values are read from the memory during the imaging operation, and in an embodiment wherein the nominal values are calculated.

In order to increase the accuracy further, in a modification of the method according to the invention, at least two analog actual value signals, which have a phase offset in relation to one another, are processed, for example, alternately. This offers the advantage that, at any time, an analog actual value signal is processed having a slope of sufficiently high magnitude, so that, respectively, very precise triggering of the clock pulses is possible.

In addition, besides at least one actual value signal, a so-called reference signal can be generated by the angular position transmitter and, if necessary or desirable, processed in the clock generator. A reference signal of this type can be outputted, for example, at a defined angular position of the angular position transmitter during each revolution. Evaluation or processing of this reference signal is particularly advantageous for corrections, because for this purpose information about the absolute angle of the angular position transmitter is helpful.

Other features which are considered as characteristic for the invention are set forth in the appended claims.

Although the invention is illustrated and described herein as embodied in a clock generator for an imaging device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, wherein:

DESCRIPTION OF THE PREFERRED EMBODIMENTS

Figure 1:
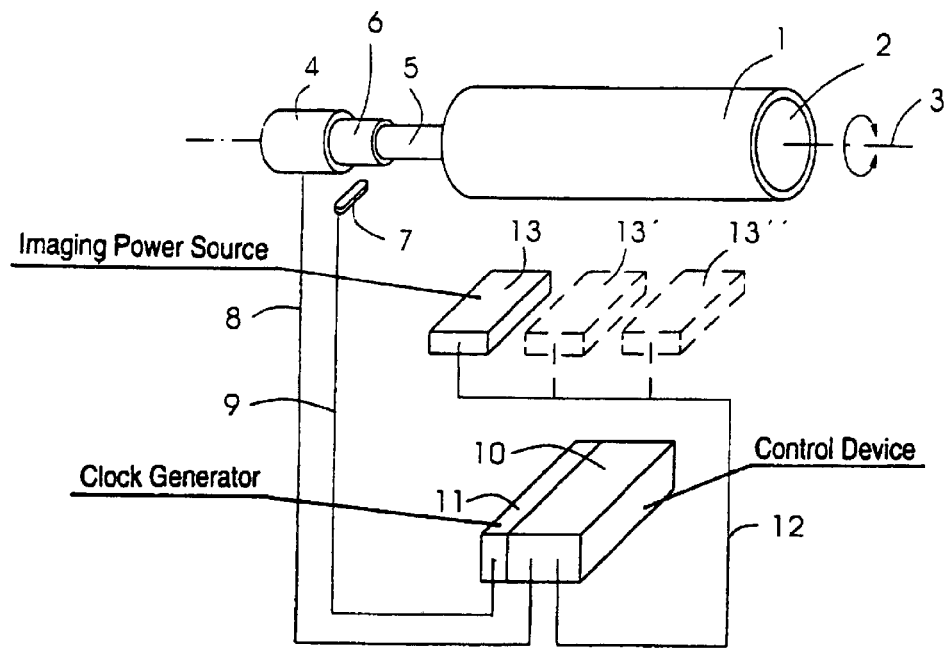
FIG. 1 is a diagrammatic perspective and schematic view of a device for setting an image on a printing form.

Referring now to the drawings and, first, particularly to FIG. 1 thereof, there is shown therein diagrammatically and schematically a device according to the invention for setting an image on a printing form or plate 1. The printing form 1 is clamped onto a cylinder 2, which rotates about the longitudinal axis 3 thereof. The cylinder 2 is driven by a motor 4, which is mechanically connected to the cylinder 2 via a shaft 5. Arranged on the shaft 5 is a transmitter 6, which rotates with the shaft 5 and cooperates with a sensor 7 having a spatial position relative to the transmitter 6, which is known with sufficient precision, the transmitter 6 thus being disposed in a locally fixed position, for example. The transmitter 6 may be, for example, an arrangement of permanent magnets, by the aid of which a magnetic field with a geometry prescribed by the arrangement of the permanent magnets is generated. During the rotation of the shaft 5, the magnetic field rotates therewith in a corresponding manner, so that the respective angular position of the shaft 5 is registered with the aid of the sensor 7, which is formed, for example, as a Hall probe, and is outputted in the form of a corresponding actual value signal.

The motor 4 and the sensor 7 are connected via lines 8 and 9, respectively, to a control device 10, which controls the imaging operation. The control device 10 has, amongst other components, a clock generator 11, which processes the actual value signal output by the sensor 7 and derives therefrom a clock signal which is needed for controlling the imaging operation.

The control device 10 is connected via a further line 12 to an imaging power source 13. There may also be more than one imaging power source 13. This is indicated by the further imaging power sources 13' and 13" shown in broken lines. The imaging power source 13 is disposed opposite the printing form 1 and is displaceable parallel to the longitudinal axis 3 of the cylinder 2. By a suitable combination of the rotational movement of the cylinder 2 and the translational movement of the imaging power source 13, the entire surface of the printing form 1 can be scanned and, at the same time, the desired image-setting information can be transferred. The imaging power source 13 can be, for example, a spark discharge source, a particle radiation source or, in a preferred embodiment, a light source, in particular, a laser light source or an array of a number of laser light sources.

During the setting of an image on the printing form 1, the cylinder 2 is set into rotation by the motor 4 as prescribed or predefined by the control device 10. In addition, the imaging power source 13 executes a translational movement, which is likewise prescribed by the control device 10. At the instant of time that the imaging power source 13 has reached a desired position relative to the printing form 1, in which position a transfer of image-setting information is to be carried out, the control device 10 arranges for the imaging power source 13 to release an amount of power needed to transfer the image-setting information to the printing form 1.

With respect to the rotational movement, the fact that the desired position has been reached is signaled by the clock signal outputted by the clock generator 11. After the image-setting information assigned for this position has been transferred, the next desired position arrives, and a further transfer of image-setting information to the printing form 1 takes place. This operation is repeated until all the image-setting information has been transferred completely to the printing form 1.

The setting of an image on the printing form 1 can be carried out either directly in a printing machine appropriately equipped for the purpose or in a separate imaging or image-setting machine.

Figure 2:
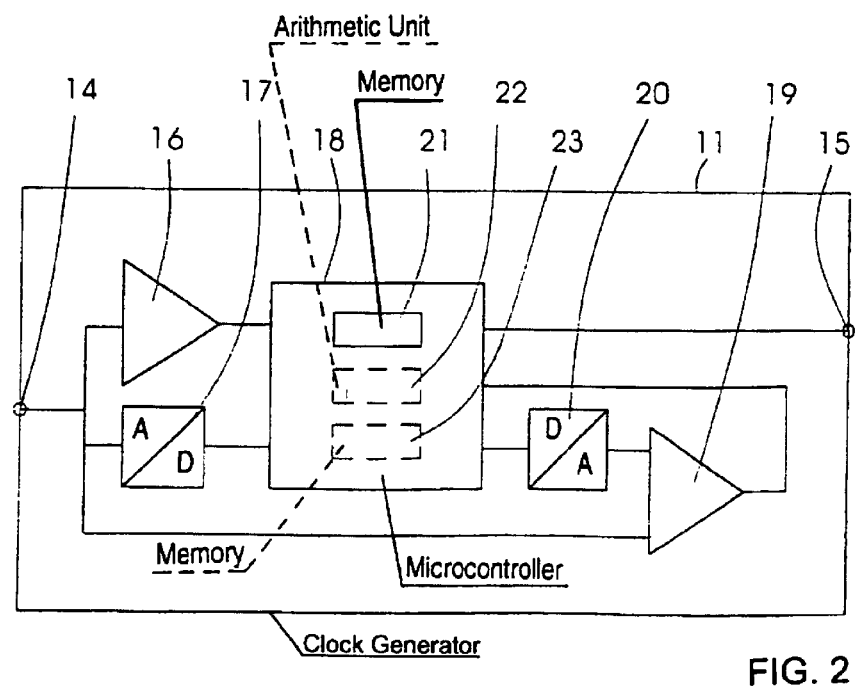
FIG. 2 is a basic circuit diagram of a clock generator according to the invention.

FIG. 2 shows a basic circuit diagram of the clock generator 11 according to the invention. The clock generator 11 has an input 14 and an output 15. Applied to the input 14 is the actual value signal generated by the sensor 7 for the angular position of the printing form 1. At the output 15, the clock signal for the control of the imaging operation is outputted.

The input 14 of the clock generator 11 is connected to the input of a comparator 16 and to the input of an analog/digital converter 17, the outputs, respectively, from which are connected to a microcontroller 18. The microcontroller 18 is further connected to the output 15 of the clock generator, to the output of a comparator 19 and to the input of a digital/analog converter 20. The comparator 19 has two inputs, one of the inputs being connected to the input 14 of the clock generator 11 and the other input being connected to the output of the digital/analog converter 20.

The microcontroller 18 has, amongst other components, a memory 21 for storing the nominal or desired values for the angular position of the printing form 1, and/or an arithmetic unit 22 for calculating the nominal or desired values. In addition, the microcontroller 18 can optionally have a correction value memory 23 for correcting the nominal or desired values for the angular position of the printing form 1.

The basic principle of the clock generator 11 shown in FIG. 2 is that the comparator 19 compares the analog actual value signal for the angular position of the printing form 1, which is applied to the first input of the comparator 19, with an analog nominal or desired value signal, which is applied to the second input of the comparator 19, which specifies the respective nominal or desired value for the angular position of the printing form 1. If the condition upon which the comparison is based is satisfied, it is apparent that the desired angular position has been reached, and the comparator 19 changes the output level thereof in order to cause the microcontroller 18 to output a clock pulse at the output 15 of the clock generator 11.

Figure 3:
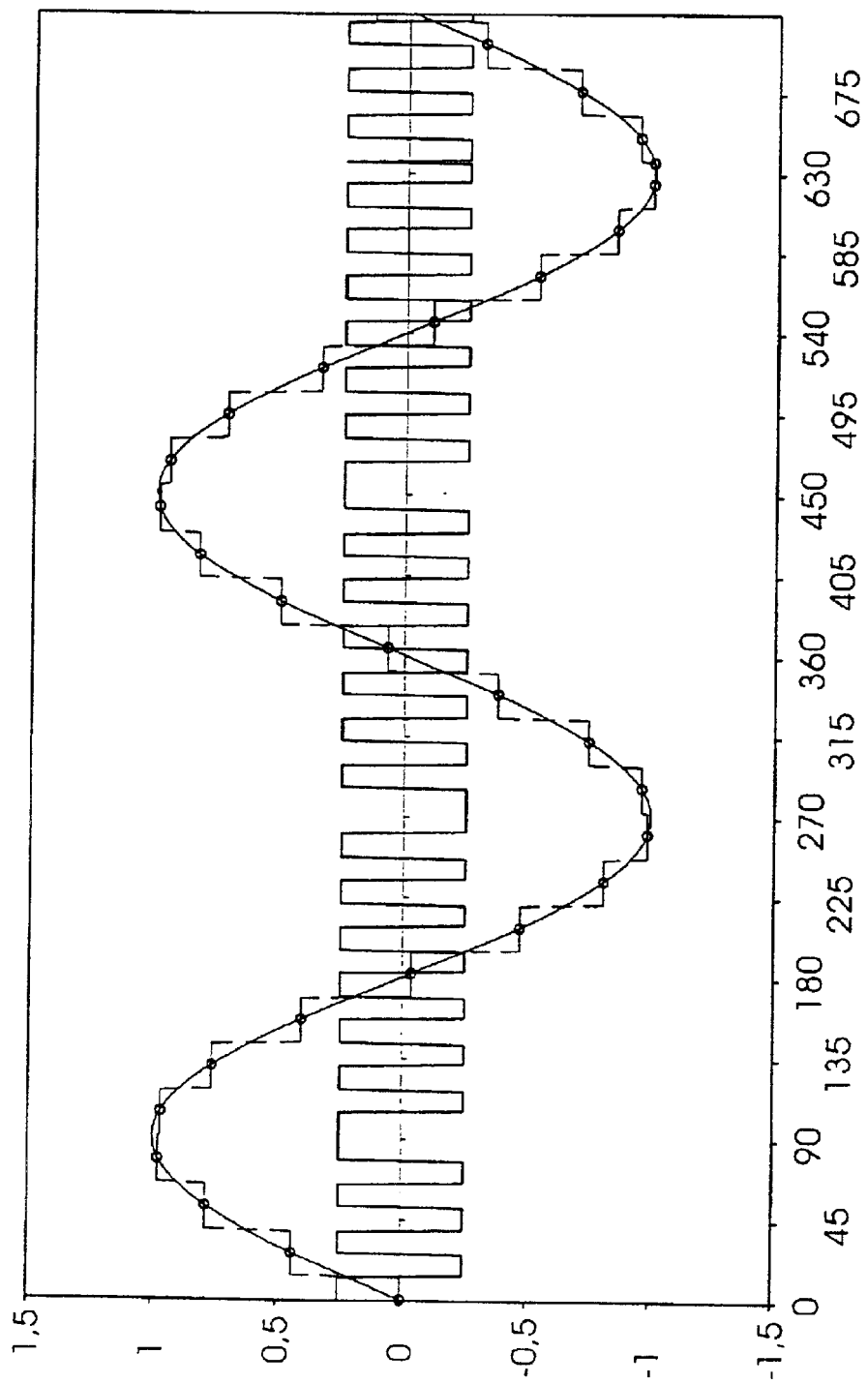
FIG. 3 is a plot diagram showing the course of various signals over time.

In order to clarify the manner in which the clock generator 11 functions, the course of the relevant signals over time is shown in FIG. 3. In each case, the amplitude of the signals, normalized to the maximum signal value, is plotted as a function of the angular position of the printing form 1 in degrees. For the illustration, a sinusoidal actual value signal has been selected by way of example. Also illustrated in FIG. 3 are the analog nominal value signal (broken line) and the square wave output signal from the comparator 19.

In detail, the way in which the clock generator 11 functions takes place as follows:

The comparator 16 checks the analog actual value signal for the angular position of the printing form 1 as to whether a prescribed or predefined condition has been satisfied, for example, whether there is a zero crossing, and accordingly outputs a starting signal to the microcontroller 18. The microcontroller 18 then outputs a nominal or desired value for the angular position of the printing form 1 to the digital/analog converter 20, which converts the nominal or desired value into an analog nominal or desired value signal for the angular position of the printing form 1. The analog nominal or desired value signal is fed into the comparator 19 as a comparison signal for a comparison with the analog actual value signal. At the instant of time that the amplitude of the analog actual value signal has reached the amplitude prescribed or predefined by the analog nominal or desired value signal (note the points of intersection shown in FIG. 3 between the analog actual value signal and the analog nominal or desired value signal), the output of the comparator 19 flips. This is registered by the microcontroller 18, which then outputs a clock pulse at the output 15 of the clock generator 11. As an alternative thereto, the clock pulse could also be generated by a digital signal processor or by a hardware circuit which, for this purpose, is driven appropriately by the comparator 19, or the output signal from the comparator 19 could also be used as a clock signal directly, i.e., without further processing. It is also clear to those skilled in the art that, as an alternative to using a second comparator 16, the function thereof for generating a starting signal can be performed by the first comparator 19, assuming an appropriate modification of the construction thereof.

As the next step, the microcontroller 18 outputs a new nominal or desired value to the digital/analog converter 20, which then modifies the analog nominal or desired value signal in a corresponding manner. The comparator 19 is thereby caused to assume the original output level thereof again. When the amplitude of the analog actual value signal has reached the amplitude of the analog nominal or desired value signal again, the output of the comparator 19 flips again and a clock pulse is generated once more, a new nominal or desired value is outputted, and so forth.

The nominal or desired values for the angular position of the printing form 1 can be provided in different ways. According to a first embodiment, the nominal or desired values are determined in advance and stored as tabular values in the memory 21 of the microcontroller 18. In order to realize non-even-numbered divider ratios, tabular values for a number of periods can be stored. In this regard, the nominal or desired values for the angular position of the printing form 1 can be determined in a calibration run with the aid of the analog/digital converter 16, specifically for the respective imaging device. In this case, the nominal or desired values already take into account any geometric errors of the printing form 1 or deviations of the analog actual value signal from the ideal sinusoidal form, and so forth, so that a correction during the imaging operation is rendered superfluous. The first embodiment can also be modified so that standard values for the nominal or desired values are stored, and the information from the calibration run can be used to determine correction values for the standard nominal or desired values, which are stored in the correction value memory 23. During the imaging operation, the nominal or desired values are then, respectively, corrected before being outputted by the microcontroller 18, by being linked with the respective correction values. In addition to the possibility of taking into account corrections, for example, of the amplitude, by using the analog/digital converter 16, a correction may also be realized as an effect upon the reference voltage of the digital/analog converter 20.

In a second embodiment, the nominal or desired values are, respectively, determined by calculation during the imaging operation. For this purpose, in each case with the aid of the arithmetic unit 22, the microcontroller 18 executes an appropriate algorithm, which can be stored as software or can also be contained as hardware in the microcontroller 18. In the second embodiment, too, it is possible to carry out a calibration run in advance and to store correction values for the nominal or desired values. These correction values, respectively, can be linked with the calculated nominal or desired values during the imaging operation.

In order to increase the accuracy of the clock generator, in particular in the region of the vertices of the sinusoidal actual value signal, around which the change in amplitude of the actual value signal is very low, use can be made of at least a second sinusoidal actual value signal which has a phase offset in relation to the first actual value signal, preferably a phase offset of 90°. This permits an evaluation of at least one actual value signal in an angular interval wherein this signal has a high slope. For the case of sinusoidal signals, therefore, for example, an alternating evaluation of the two actual value signals, respectively, can be performed in the region of the zero crossings thereof, where the slope of the sinusoidal curves, respectively, is at an extreme. Alternatively to this construction of two phase-offset actual value signals, two comparators and two digital/analog converters can also be used, between which output signals are connected.

In general, during the imaging operation, a plurality of system functions of the imaging device have to be coordinated or synchronized with the rotation of the printing form cylinder. Typically, therefore, a plurality of derived clocks, generally with different resolutions, are needed. For example, these may be the actual pixel clock, the advance clock for the translation of the imaging device and/or the rotation of the cylinder, a clock for time-offset driving of the image-setting light sources, a clock for driving a necessarily or desirably provided autofocusing system, or the like. A further advantage of the clock generator according to the invention may also be that, by adding further comparators and by calculating in the general case, a plurality of independent clocks can be generated for mutually independent nominal or desired values for the comparators.

We claim:

1. A clock generator for generating a clock signal for an imaging device serving for transferring image-setting information to a rotatable printing form, the clock generator comprising:
   an input to which an actual value signal dependent upon an angular position of the printing form is applicable;
   an output for outputting the clock signal;
   a first comparator having:
      a first input for receiving the actual value signal as an analog signal;
      a second input for receiving an analog nominal value signal, representing a nominal value for the angular position of the printing form; and
      an output for outputting the clock signal formed as a function of a result of a comparison between the analog actual value signal and the analog nominal value signal;
   a second comparator having:
      an input for receiving the actual value signal as an analog signal; and
      an output for outputting a starting signal for starting the clock generator when the analog actual value signal satisfies a prescribed condition.

2. The clock generator according to claim 1, wherein said first comparator serves for outputting a clock pulse, respectively, when there is agreement between the amplitude of the analog actual value signal and the amplitude of the analog nominal value signal.

3. The clock generator according to claim 1, further comprising a memory wherein the nominal values for the angular position of the printing form are stored.

4. The clock generator according to claim 1, further comprising an arithmetic unit for determining the nominal values for the angular position of the printing form.

5. The clock generator according to claim 1, further comprising a correction value memory wherein correction values for correcting the nominal values for the angular position of the printing form are stored.

6. The clock generator according to claim 1, further comprising a digital/analog converter into which the nominal values for generating the analog nominal value signal are feedable.

7. The clock generator according to claim 1, wherein the actual value signal has a sinusoidal waveform.

8. A method for setting an image on a rotatable printing form, which comprises transferring image-setting information to the printing form as a function of a clock signal depending upon an angular position of the printing form, after determining the clock signal from an analog actual value signal dependent upon the angular position of the printing form, and an analog nominal value signal specifying the respective nominal value for the angular position of the printing form, via an analog comparison by using the clock generator according to claim 1.

9. The method according to claim 8, which further comprises determining the nominal values for the angular position of the printing form in advance in a calibration run, and storing the determined nominal values.

10. The method according to claim 8, which further comprises determining correction values for correcting the nominal values for the angular position of the printing form in advance in a calibration run, and storing the determined correction values.

11. The method according to claim 8, which further comprises processing at least two actual value signals having a phase offset relative to one another.

12. An imaging device for a printing machine, comprising:
 a clock generator for generating a clock signal for the imaging device which serves for transferring image-setting information to a rotatable printing form, the clock generator having:
  an input to which an actual value signal dependent upon an angular position of the printing form is applicable;
  an output for outputting the clock signal;
  a first comparator having:
   a first input for receiving the actual value signal as an analog signal;
   a second input for receiving an analog nominal value signal, representing a nominal value for the angular position of the printing form; and
   an output for outputting the clock signal formed as a function of a result of a comparison between the analog actual value signal and the analog nominal value signal;
  a second comparator having:
   an input for receiving the actual value signal as an analog signal; and
   an output for outputting a starting signal for starting the clock generator when the analog actual value signal satisfies a prescribed condition.

13. A printing machine, comprising:
 a clock generator for generating a clock signal for an imaging device serving for transferring image-setting information to a rotatable printing form, the clock generator having:
  an input to which an actual value signal dependent upon an angular position of the printing form is applicable;
  an output for outputting the clock signal;
  a first comparator having:
   a first input for receiving the actual value signal as an analog signal;
   a second input for receiving an analog nominal value signal, representing a nominal value for the angular position of the printing form; and
   an output for outputting the clock signal formed as a function of a result of a comparison between the analog actual value signal and the analog nominal value signal;
  a second comparator having:
   an input for receiving the actual value signal as an analog signal; and
 an output for outputting a starting signal for starting the clock generator when the analog actual value signal satisfies a prescribed condition.

* * * * *